(12) United States Patent
Wheeler et al.

(10) Patent No.: US 7,226,107 B1
(45) Date of Patent: Jun. 5, 2007

(54) METHOD AND APPARATUS FOR SUNVISOR ATTACHMENT

(75) Inventors: Daniel J. Wheeler, Clarkston, MI (US); Gregory J. Vargo, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 6 days.

(21) Appl. No.: 11/291,119

(22) Filed: Nov. 30, 2005

(51) Int. Cl.
*B60J 3/00* (2006.01)

(52) U.S. Cl. ..................................................... 296/97.9

(58) Field of Classification Search ............... 296/97.9; 248/289.11
See application file for complete search history.

(56) References Cited

U.S. PATENT DOCUMENTS

| | | | |
|---|---|---|---|
| 5,201,564 A * | 4/1993 | Price | 296/97.9 |
| 5,752,853 A * | 5/1998 | Curtindale | 296/97.9 |
| 5,975,617 A * | 11/1999 | Jacquemin et al. | 296/97.9 |
| 6,003,928 A * | 12/1999 | Curtindale | 296/97.9 |
| 6,007,136 A * | 12/1999 | Zittwitz et al. | 296/97.9 |
| 6,021,986 A * | 2/2000 | Murdock | 296/97.9 |
| 6,068,323 A * | 5/2000 | Brown et al. | 296/97.9 |
| 6,398,295 B2 * | 6/2002 | Asai | 296/97.9 |
| 6,595,571 B1 * | 7/2003 | Krebs et al. | 296/97.9 |
| 6,773,051 B2 * | 8/2004 | Davey et al. | 296/97.7 |
| 6,799,743 B2 * | 10/2004 | Sawayanagi | 296/97.9 |
| 6,817,583 B2 * | 11/2004 | Wilson | 296/97.9 |
| 7,036,877 B2 * | 5/2006 | Schultz et al. | 296/97.9 |
| 7,086,124 B2 * | 8/2006 | Del Pozo Abejon | 24/295 |

* cited by examiner

*Primary Examiner*—Kiran B. Patel
(74) *Attorney, Agent, or Firm*—Laura C. Hargitt

(57) ABSTRACT

The sunvisor attachment apparatus of the present invention includes a mounting bezel configured to retain a sunvisor sub-assembly. The mounting bezel includes an alignment protrusion adapted to align the mounting bezel relative to the vehicle. The alignment protrusion includes a mounting clip configured to temporarily retain the mounting bezel to the vehicle. The mounting bezel also includes an attachment boss positioned to align with a complementary attachment feature of the vehicle when the mounting bezel is aligned with the vehicle. The sunvisor attachment apparatus also includes a fastener configured to more permanently attach the mounting bezel to the vehicle. Advantageously, the temporary retention of the mounting bezel to the vehicle allows the fastener to be driven to more permanently attach the mounting bezel to the vehicle in a simplified hands-free manner.

9 Claims, 2 Drawing Sheets

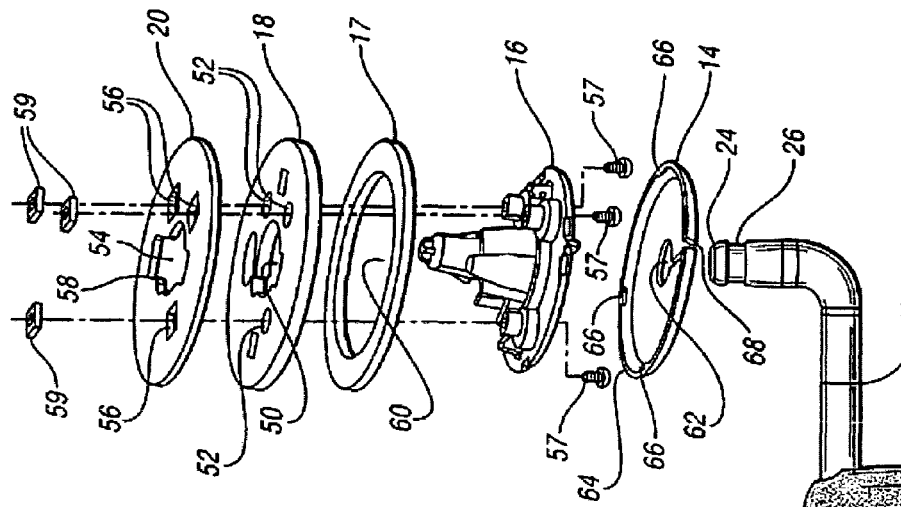
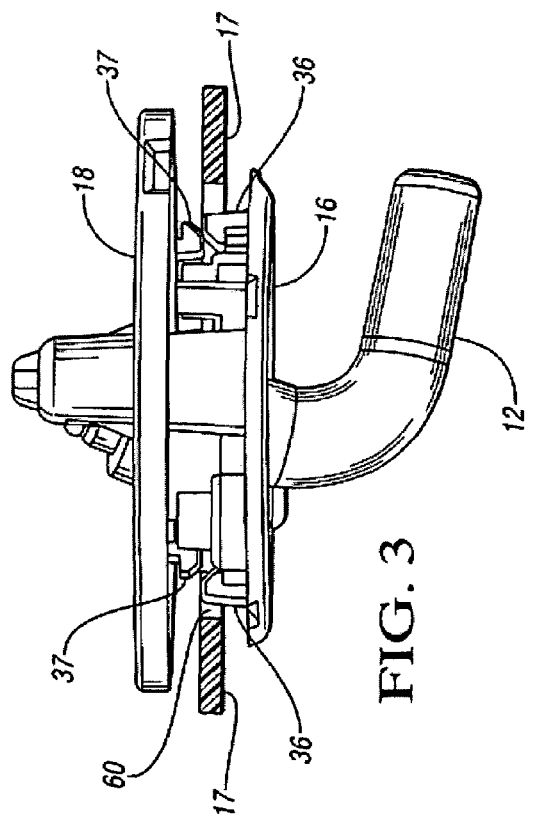
FIG. 1
FIG. 3

METHOD AND APPARATUS FOR SUNVISOR ATTACHMENT

TECHNICAL FIELD

The present invention pertains generally to an improved method and apparatus for attaching a sunvisor to a vehicle.

BACKGROUND OF THE INVENTION

Two known methods for attaching a sunvisor to a vehicle include a "modular build" method and a "layered build" method. According to the modular build method, the sunvisor is initially mounted to a headliner sub-assembly which is thereafter installed into a vehicle as a single modular unit. According to the layered build method, the sunvisor is mounted directly to the vehicle as the vehicle is being assembled.

SUMMARY OF THE INVENTION

The sunvisor attachment apparatus of the present invention includes a mounting bezel configured to retain a sunvisor sub-assembly. The mounting bezel includes an alignment protrusion adapted to engage a predefined portion of a vehicle and thereby align the mounting bezel relative to the vehicle. The alignment protrusion includes a plurality of mounting clips configured to temporarily retain the mounting bezel to the vehicle. The mounting bezel also includes an attachment boss positioned to align with a complementary attachment feature of the vehicle when the mounting bezel is aligned with the vehicle.

The sunvisor attachment apparatus also includes a fastener to be driven through the attachment boss. The fastener is configured to more permanently attach the mounting bezel to the vehicle after the mounting clips have temporarily retained the mounting bezel to the vehicle. Advantageously, the temporary retention of the mounting bezel to the vehicle allows the fastener to be driven without physically supporting the mounting bezel such that the more permanent attachment of the mounting bezel to the vehicle can be performed in a simplified hands-free manner.

A preferred method for attaching a sunvisor to a vehicle includes attaching a sunvisor sub-assembly to a mounting bezel. The mounting bezel includes an attachment boss; and an alignment protrusion having a plurality of mounting clips. The mounting bezel is attachable to a modular plate such that a headliner may be trapped therebetween. The headliner with the mounting bezel and modular plate attached thereto may then be installed into the vehicle. While the headliner is being installed into the vehicle, the alignment protrusion of the mounting bezel is engaged with a predefined portion of the vehicle to align the mounting bezel with the vehicle. The mounting bezel is then temporarily attached to the vehicle by engaging the mounting clips of the alignment protrusion with the vehicle. After the mounting bezel has been temporarily attached to the vehicle, the fastener is driven through the attachment boss into engagement with the vehicle such that a more permanent attachment of the mounting bezel to the vehicle can be obtained in a simplified hands-free manner.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is an exploded perspective view of a sunvisor attachment apparatus according to the present invention;

FIG. 3 is a side view of a mounting bezel being attached to a modular plate with a vehicle headliner therebetween in accordance with the preferred modular build method of the present invention.

DESCRIPTION OF THE PREFERRED EMBODIMENTS

Figure 2:
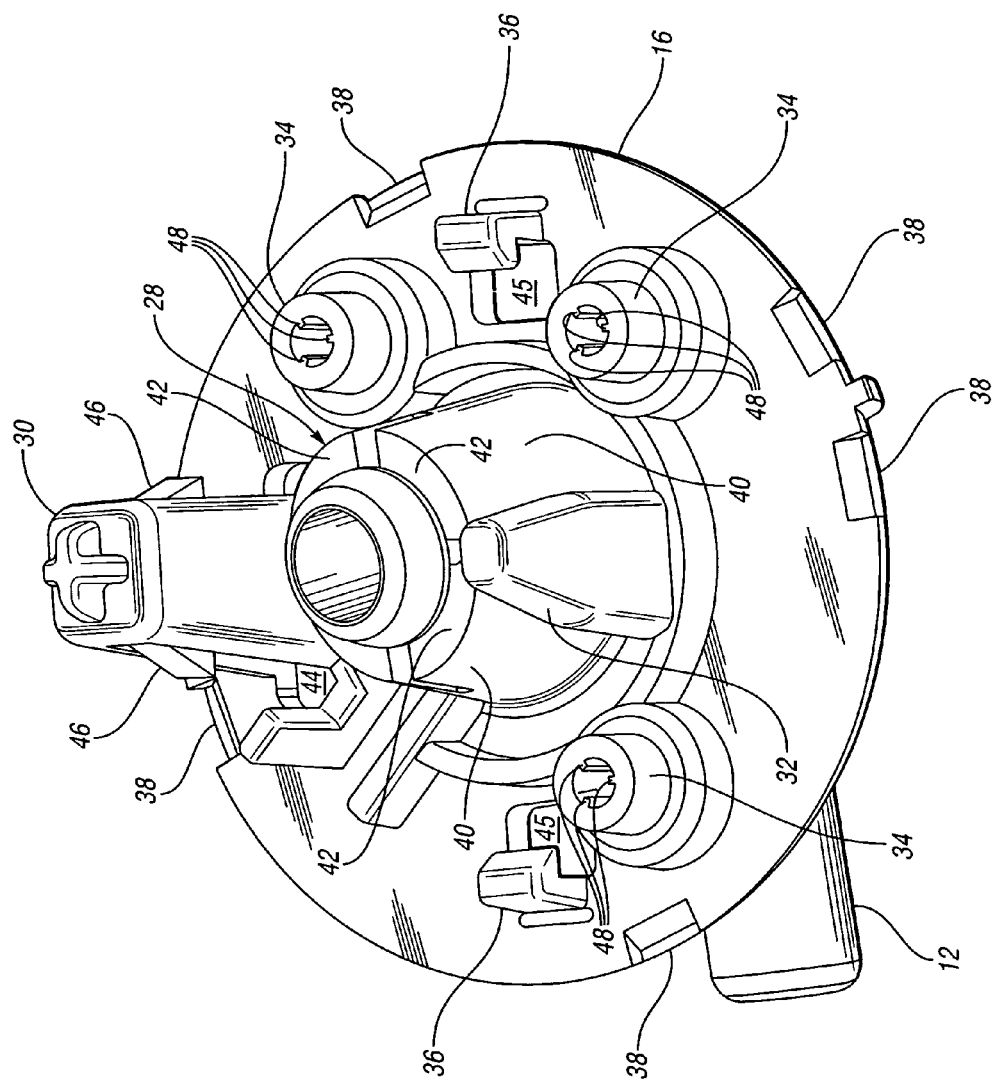
FIG. 2 is a perspective view of pivot rod and a mounting bezel of the sunvisor attachment apparatus of FIG. 1.

Referring to the drawings, wherein like reference numbers refer to like components, FIG. 1 shows an exploded perspective view of a sunvisor 10, a pivot rod 12, a fastener cover 14, a mounting bezel 16, a schematically illustrated portion of a vehicle headliner 17, a modular plate 18, and a portion of the inner roof panel 20. The pivot rod 12 is attached to the sunvisor 10 in a conventional manner, and the two components are preferably pre-assembled to provide a sunvisor sub-assembly 22. The pivot rod 12 is generally cylindrical and has a tapered end portion 24 adapted to facilitate installation into the mounting bezel 16. The pivot rod 12 defines a peripheral groove 26 near the end portion 24 that is adapted to maintain engagement with the mounting bezel 16.

Referring to FIG. 2, the pivot rod 12 of the sunvisor sub-assembly 22 (shown in FIG. 1) is shown assembled to the mounting bezel 16. The mounting bezel 16 includes a visor retention tower 28, a first alignment protrusion 30, a second alignment protrusion 32, and a plurality of attachment bosses 34. The mounting bezel 16 also preferably includes a first plurality of retention clips 36 adapted to retain the modular plate 18, and a second plurality of retention clips 38 adapted to retain the fastener cover 14. According to a preferred embodiment, the mounting bezel 16 is composed of injection molded plastic, and the components of the mounting bezel 16 described hereinabove are integrally formed during the molding process.

The visor retention tower 28 is preferably hollow and generally cylindrical to accommodate the pivot rod 12 of the sunvisor sub-assembly 22 (shown in FIG. 1). The visor retention tower 28 is defined by four fingers 40 each extending from the surface of the mounting bezel 16 and terminating in retention tab 42. As the end portion 24 of the pivot rod 12 is inserted into the retention tower 28 during installation and engages the retention tabs 42, the tapered geometry of the end portion 24 expands the fingers 40 in a radially outward direction thereby allowing the end portion 24 to pass through the retention tower 28. After the end portion 24 of the pivot rod 12 passes through the retention tower 28, the fingers 40 radially retract such that the retention tabs 42 are disposed within the peripheral groove 26. In this manner, the assembly of the pivot rod 12 of the sunvisor sub-assembly 22 to the retention tower 28 of the mounting bezel 16 is a "snap-fit" or "press-fit" operation.

The first and second alignment protrusions 30, 32 of the mounting bezel 16 are configured to engage a predefined portion of the vehicle's inner roof panel 20 (shown in FIG. 1). According to a preferred embodiment, the "predefined portion" of the vehicles inner roof panel 20 is the peripheral edge 58 described in detail hereinafter, however, the first and second alignment protrusions 30, 32 may alternately be configured to engage other portions of the inner roof panel 20 as well. The first alignment protrusion 30 includes a pair of mounting tabs or clips 46 adapted to facilitate the temporary attachment of the sunvisor sub-assembly 22 (shown in FIG. 1) to the vehicle's sheet metal inner roof panel 20. The temporary attachment of the sunvisor sub-assembly 22 advantageously permits a "hands-free" final attachment. In other words, by aligning and temporarily attaching the mounting bezel 16 to the inner roof panel 20, the sunvisor sub-assembly 22 may thereafter be more permanently attached to a vehicle without physically supporting the mounting bezel 16 during such attachment. Therefore, for purposes of the present invention, a "hands-free" attachment refers to an attachment wherein a fastener such as a screw can be driven without physically supporting or positioning the components during the attachment.

The mounting bezel 16 preferably defines an access port 44 positioned near the first alignment protrusion 30. The access port 44 is configured to provide access to the mounting tabs 46 after the mounting bezel 16 has been assembled to a vehicle. The mounting bezel 16 also preferably defines an access port 45 near each of the retention clips 36. The access ports 45 are configured to provide access to the retention clips 36 after the mounting bezel 16 has been attached to the modular plate 18. In this manner, the mounting tabs 46 can be disengaged from the vehicle and the retention clips 36 can be disengaged from the modular plate 18 to service the sunvisor sub-assembly 22 (shown in FIG. 1) without removing the entire headliner 17 (shown in FIG. 1).

The attachment bosses 34 of the mounting bezel 16 are positioned relative to the first and second alignment protrusions 30, 32 such that the attachment bosses 34 align with complementary attachment features, such as the plurality of attachment apertures 56 (shown in FIG. 1) in the inner roof panel 20 (shown in FIG. 1), when the mounting bezel 16 is attached to the roof panel 20. A fastener such as the screw 57 is disposed in each of the attachment bosses 34. According to a preferred embodiment, the mounting bezel 16 is shipped together with the screws 57 as a sub-assembly to facilitate final installation into a vehicle. In this manner, the final assembly plant can reduce inventory and storage otherwise required for the individual screws. The attachment bosses 34 each include a plurality of strippable ribs 48 configured to retain the screws 57. The ribs 48 are designed to strip out when a force of approximately 2 newton-meters is applied. Therefore, the ribs 48 retain the screws 57 during shipping and will strip out when the screws 57 are tightened to the inner roof panel 20 such that the ribs 48 do not interfere with the final attachment of the sunvisor sub-assembly 22 (shown in FIG. 1) to the vehicle.

According to a preferred embodiment, there are three attachment bosses 34. The three attachment bosses 34 are positioned such that when the mounting bezel 16 is attached to the inner roof panel 20 (shown in FIG. 1) of a vehicle, two of the attachment bosses 34 are aligned with the windshield (not shown), and two of the attachment bosses 34 are aligned with the side door (not shown). Advantageously, this attachment boss pattern provides stability for the sunvisor 10 (shown in FIG. 1) in two primary positions, the first being when the sunvisor 10 is positioned to block sun from the front windshield (not shown) and the second being when the sunvisor 10 is positioned to block sun from a side window (not shown). Additionally, the preferred attachment boss pattern allows the screws 57 to be installed without having to move the sunvisor 10 for access such that the installation process is simplified.

Referring again to FIG. 1, the modular plate 18 defines an aperture 50 allowing the visor retention tower 28 (shown in FIG. 2), the first alignment protrusion 30 (shown in FIG. 2), and the second alignment protrusion 32 (shown in FIG. 2) to pass therethrough. The modular plate 18 also defines a plurality of holes 52 adapted to accommodate the attachment bosses 34 (shown in FIG. 2) of the mounting bezel 16. As shown in FIG. 3, the modular plate 18 includes a plurality of integral clips 37 adapted to engage the clips 36 of the mounting bezel 16 and thereby attach the modular plate 18 to the mounting bezel 16. It should be appreciated that the modular plate 18 is adapted for use in accordance with the preferred "modular build" method of the present invention as will be described in detail hereinafter, but is not used with the alternate "layered build" method.

The headliner 17 defines a clearance aperture 60 allowing portions of the mounting bezel 16 and the modular plate 18 to pass therethrough such that the headliner 17 becomes trapped between the mounting bezel 16 and the modular plate 18 during assembly. Therefore, the inner diameter defined by the clearance aperture 60 is large enough to allow portions of the mounting bezel 16 and the modular plate 18 to pass therethrough, yet is smaller than the outer diameters defined by the mounting bezel 16 and the modular plate 18. The headliner 17 is preferably composed of a molded composite material; however, alternate compositions may be envisioned.

Referring again to FIG. 1, the vehicle's inner roof panel 20 preferably defines a plurality of apertures adapted to facilitate the installation of the sunvisor. More precisely, the inner roof panel 20 preferably defines an alignment aperture 54 and a plurality of attachment apertures 56. The alignment aperture 54 is defined by a peripheral edge 58 of the inner roof panel 20. The alignment aperture 54 is positioned such that when the peripheral edge 58 is engaged by the first and second alignment protrusions 30, 32 (shown in FIG. 2) of the mounting bezel 16, the attachment bosses 34 (shown in FIG. 2) are automatically aligned with a respective attachment aperture 56. A nut 59 is preferably disposed in each of the attachment apertures 56, and is configured to retain a screw 57 located in one of the attachment bosses 34.

The fastener cover 14 defines an aperture 62 through which the pivot rod 12 of the sunvisor sub-assembly 22 is inserted. The fastener cover 14 includes a peripheral edge 64 defining a plurality of integral clips 66. The integral clips 66 are each adapted to align with and engage a retention clip 38 of the mounting bezel 16 to attach the fastener cover 14 to the mounting bezel 16 and thereby cover the screws 57. The fastener cover 14 also defines a cut section 68 adapted to facilitate installation. The fastener cover 14 is preferably implemented for cosmetic purposes.

Referring to FIGS. 1–2, the present invention provides the preferred "modular build" method of assembling the sunvisor sub-assembly 22 to a vehicle, and the alternate "layered build" method of assembling the sunvisor sub-assembly 22 to a vehicle. The preferred and alternate methods of assembly in accordance with the present invention will hereinafter be described separately.

According to the preferred modular build method of assembly, the sunvisor 10 is first attached to the headliner 17 which is thereafter installed into a vehicle as a single modular unit. The modular build method of assembly is preferably initiated by attaching the pivot rod 12 to the retention tower 28 of the mounting bezel 16. As previously indicated, this assembly step is preferably a snap-fit operation. The mounting bezel 16 is thereafter placed into an assembly fixture (not shown) to retain and precisely locate the mounting bezel 16 during the assembly process. The headliner 17 is placed onto or with respect to the fixtured mounting bezel 16 such that the visor retention tower 28, the first alignment protrusion 30, the second alignment protrusion 32, the attachment bosses 34, and the clips 36 pass through the headliner aperture 60. The modular plate 18 is then snapped into engagement with the mounting bezel 16 such that the modular plate clips 37 (shown in FIG. 3) engage and retain the mounting bezel clips 36, and the headliner 17 is trapped between the mounting bezel 16 and the modular plate 18.

After the sunvisor sub-assembly 22, the mounting bezel 16, and the modular plate 18 are attached to the headliner 17, the headliner 17 is installed into a vehicle. As the headliner 17 is installed, the first and second alignment protrusions 30, 32 are inserted into the inner roof panel alignment aperture 54. After the first alignment protrusion 30 is inserted into the alignment aperture 54, the mounting clips 46 engage the inner roof panel 20 such that the mounting bezel 16 is temporarily mounted to the vehicle. Thereafter, the screws 57 disposed within the attachment bosses 34 are driven into the nuts 59 disposed within the attachment apertures 56 to more securely attach the sunvisor sub-assembly 22 to the vehicle. The fastener cover 14 is then installed on the pivot rod 12 and attached to the mounting bezel 16 such that the fastener cover clips 66 are retained by the retention clips 38 of the mounting bezel 16. The pivot rod 12 is configured to pass through the cut section 68 of the fastener cover 14 to facilitate the installation of the fastener cover 14 on the pivot rod 12.

According to the alternate layered build method of assembly, the sunvisor 10 is attached directly to the inner roof panel 20 of the vehicle without the modular plate 18 as the vehicle is being assembled. The layered build method of assembly is preferably initiated by attaching the pivot rod 12 to the retention tower 28 of the mounting bezel 16. As previously indicated, this assembly step is preferably a snap-fit operation. After the sunvisor sub-assembly 12 is attached to the mounting bezel 16, the alignment protrusions 30, 32 of the mounting bezel 16 are inserted through the headliner aperture 60 and into the inner roof panel alignment aperture 54. After the first alignment protrusion 30 is inserted into the alignment aperture 54, the mounting clips 46 engage the inner roof panel 20 such that the mounting bezel 16 is temporarily mounted to the vehicle. Thereafter, the screws 57 disposed within the attachment bosses 34 are driven into the nuts 59 disposed within the attachment apertures 56 to more securely attach the sunvisor sub-assembly 22 to the vehicle. The fastener cover 14 is then installed on the pivot rod 12 and attached to the mounting bezel 16 such that the fastener cover clips 66 are retained by the retention clips 38 of the mounting bezel 16. The pivot rod 12 is configured to pass through the cut section 68 of the fastener cover 14 to facilitate the installation of the fastener cover 14 on the pivot rod 12.

While the best modes for carrying out the invention have been described in detail, those familiar with the art to which this invention relates will recognize various alternative designs and embodiments for practicing the invention within the scope of the appended claims.

The invention claimed is:

1. A sunvisor attachment apparatus comprising:
 a mounting bezel configured to retain a sunvisor sub-assembly, said mounting bezel including:
  an alignment protrusion adapted to engage a predefined portion of a vehicle and thereby align the mounting bezel relative to the vehicle, the alignment protrusion including a mounting clip configured to temporarily retain the mounting bezel to the vehicle; and
  an attachment boss positioned to align with a complementary attachment feature of the vehicle when the mounting bezel is aligned relative to the vehicle;
  wherein the attachment boss is adapted to receive a fastener to more permanently attach the mounting bezel to the vehicle after the mounting clip temporarily retains the mounting bezel to the vehicle, and wherein said temporary retention of the mounting bezel to the vehicle allows the fastener to be driven to more permanently attach the mounting bezel to the vehicle in a simplified hands-free manner.

2. The sunvisor attachment apparatus of claim 1, wherein the mounting bezel defines an access port configured to provide access to the mounting clip such that the mounting clip can be retracted to conveniently service the sunvisor sub-assembly.

3. The sunvisor attachment apparatus of claim 2, wherein the mounting bezel includes three attachment bosses positioned such that when the mounting bezel is attached to the vehicle, two of the attachment bosses are aligned with a windshield of the vehicle and two of the attachment bosses are aligned with a side door of the vehicle.

4. The sunvisor attachment apparatus of claim 3, wherein the mounting bezel includes two alignment protrusions adapted to engage a predefined portion of a vehicle and thereby align the mounting bezel relative to the vehicle.

5. The sunvisor attachment apparatus of claim 4, wherein the fastener is a screw.

6. The sunvisor attachment apparatus of claim 5, wherein the mounting bezel includes a visor retention tower to which the sunvisor sub-assembly is attached using a snap-fit operation.

7. The sunvisor attachment apparatus of claim 1, further comprising a modular plate attachable to said mounting bezel such that a vehicle headliner is trapped therebetween.

8. The sunvisor attachment apparatus of claim 1, further comprising a fastener cover attached to the mounting bezel, said fastener cover configured to cover a portion of the fastener.

9. The sunvisor attachment apparatus of claim 1, wherein the attachment boss includes a strippable rib adapted to retain the fastener.

* * * * *